United States Patent
Castillo et al.

(10) Patent No.: US 6,622,250 B1
(45) Date of Patent: Sep. 16, 2003

(54) SMBUS OVER THE PCI BUS ISOLATION SCHEME AND CIRCUIT DESIGN

(75) Inventors: Michael J. Castillo, Hillsboro, OR (US); Gregory A. Lento, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,168

(22) Filed: Dec. 21, 1999

(51) Int. Cl.[7] .................................................. G06F 1/26
(52) U.S. Cl. ....................... 713/300; 713/324; 713/320; 710/100; 710/102
(58) Field of Search .............................. 713/300, 324, 713/320; 710/100, 102

(56) References Cited

U.S. PATENT DOCUMENTS

| | | | | |
|---|---|---|---|---|
| 5,867,406 A | * | 2/1999 | Yanagisawa | 364/708.1 |
| 6,038,672 A | * | 3/2000 | Klein | 713/322 |
| 6,044,422 A | * | 3/2000 | Tran | 710/69 |
| 6,061,754 A | * | 5/2000 | Cepulis et al. | 710/126 |
| 6,128,682 A | * | 10/2000 | Humpherys et al. | 710/102 |
| 6,144,219 A | * | 11/2000 | Palaniswami | 326/33 |
| 6,151,649 A | * | 11/2000 | Liong et al. | 710/126 |
| 6,205,500 B1 | * | 3/2001 | Sabotta et al. | 710/100 |
| 6,336,174 B1 | * | 1/2002 | Li et al. | 711/162 |
| 6,357,013 B1 | * | 3/2002 | Kelly et al. | 713/324 |
| 6,378,074 B1 | * | 4/2002 | Tiong | 713/200 |

FOREIGN PATENT DOCUMENTS

JP          09114773 A    *  5/1997   ............. G06F/3/00

* cited by examiner

*Primary Examiner*—Dennis M. Butler
*Assistant Examiner*—Nitin C. Patel
(74) *Attorney, Agent, or Firm*—Paul E. Steiner

(57) ABSTRACT

In accordance with an embodiment of the present invention, a computer system allows an expansion component of the computer system to properly operate even when the computer system is in a low-power mode. According to an embodiment of the present invention, a local system bus has a first section and a second section. An isolation circuit is included which selectively establishes a connection between the first section of the local system bus and the second section of the local system bus during a normal-power mode of the computer system and removes the connection between the first section of the local system bus and the second section of the local system bus during a low-power mode.

24 Claims, 1 Drawing Sheet

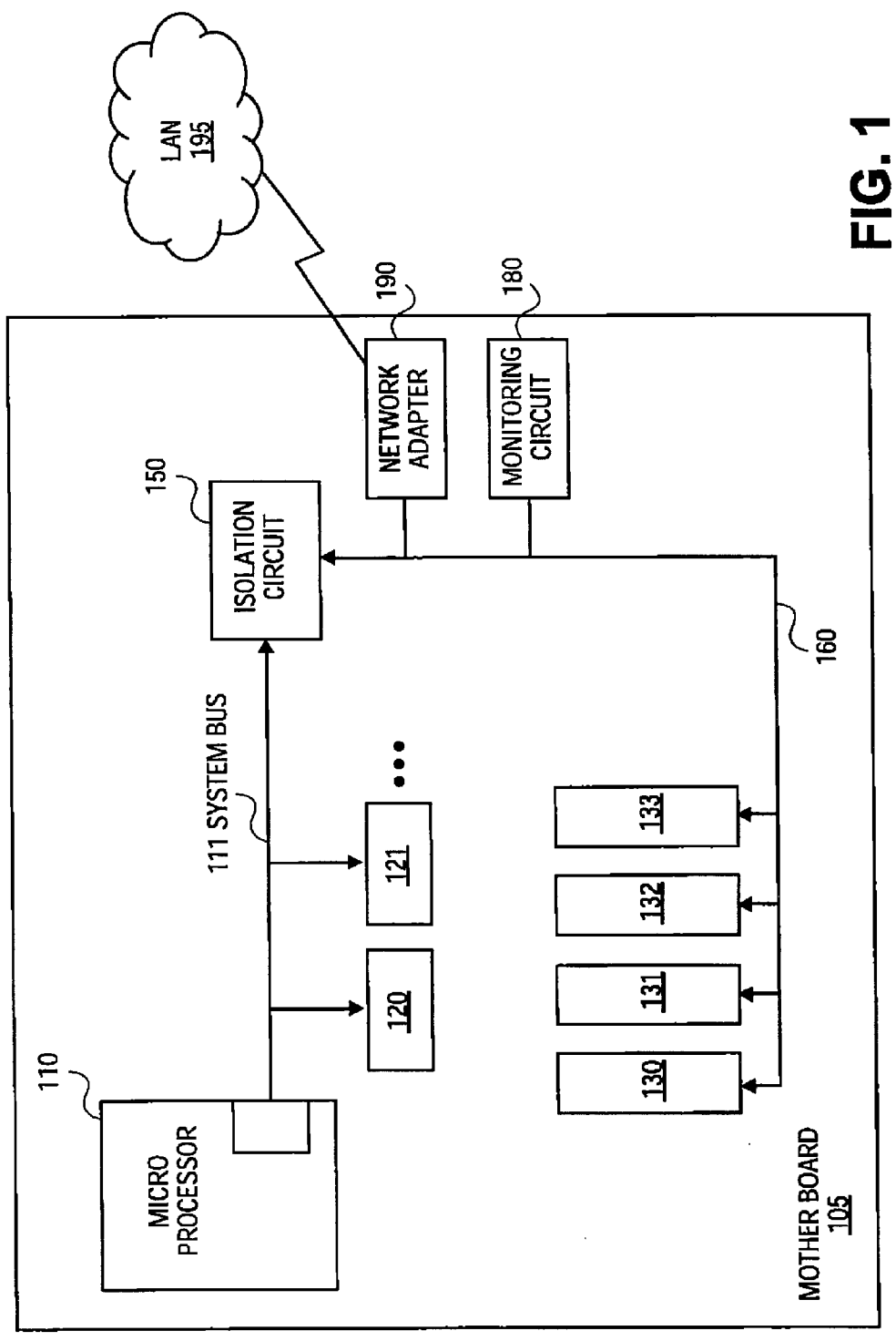

SMBUS OVER THE PCI BUS ISOLATION SCHEME AND CIRCUIT DESIGN

FIELD OF THE INVENTION

The present invention relates generally to an isolation circuit in a computer system. More particularly, the present invention relates to an isolation circuit enabling an expansion component to operated properly in a low-power mode.

BACKGROUND OF THE INVENTION

A computer system supplied by a computer manufacturer typically includes a main to printed circuit board (commonly referred to as the "motherboard") on which fixed system components are mounted. These fixed system components may include a microprocessor (as referred to as a processor), random access memory (RAM), read only memory (ROM), expansion slots, etc. Linking all of these fixed system components that are mounted onto the motherboard are a series of system buses. One particular system bus included on the motherboard is the local system bus. The local system bus is a bus used by the microprocessor. One advantage of the local system bus is that it may communicate with the microprocessor at the microprocessor's speed, which typically is the fastest operating fixed system component.

Another type of system component located on the motherboard is an expansion component. Expansion components are used to provide additional functionality to the computer system. Thus, when the local system bus is connected between the microprocessor and another system component, such as the expansion slots with expansion components like video and drive controller cards attached thereto, the overall performance of the expansion component is greatly enhanced.

In order for the computer system to operate, a power supply is coupled to the motherboard to supply power. The power supply sends power to all of the other system components through its own bus. With an increasing popularity of mobile computers, as evidenced by a growth in a market for so-called "notebook" or "laptop" computers, power consumption has become an important consideration for computer designers. Power conservation efforts have been directed at virtually every aspect of such computers, including hardware, firmware and software. For example, most of today's popular processors, such as Intel's Pentium® family of processors, are capable of operating in a low-power mode. In addition, many computer systems now include power management functionality as part of an installed BIOS (Basic Input-Output System). Software developers are also becoming more power-conscious, writing "green" applications which are themselves power efficient while cooperating with the aforementioned hardware and firmware facilities.

One of the problems faced by computer designers, firmware developers and software developers with respect to power management is the use of expansion components that require power when the computer system is in a low power state. For example, expansion components may include monitoring circuitry used to monitor the temperature or the voltage of the computer system when the computer system is operating in a normal-power mode or in a low-power mode. This monitoring circuitry provides information to a remote location which can be part of a local area network (LAN).

When the computer system operates in a low-power mode, most fixed system components are switched off and the microprocessor is either switched off or operates at reduced power. However, expansion components connected to same local system bus as the switched off fixed system components, are negatively affected by these components because the switched off component may drain power from the local system bus.

There is presently no satisfactory solution to the problem of an expansion component properly operating when the computer system is in a low-power mode.

SUMMARY OF THE INVENTION

In accordance with an embodiment of the present invention, a computer system allows an expansion component of the computer system to operate even when the computer system is in a low-power mode. According to an embodiment of the present invention, a local system bus includes a first section and a second section. An isolation circuit is included which selectively establishes a connection between the first section of the local system bus and the second section of the local system bus during a normal-power mode of the computer system and removes the connection between the first section of the local system bus and the second section of the local system bus during a low-power mode.

BRIEF DESCRIPTION OF THE DRAWINGS

The present invention will be better understood to those skilled in the art by reference to the following drawing, in conjunction with the accompanying specification, in which:

FIG. 1 is a block diagram illustrating a computer system in accordance with an embodiment of the present invention.

DETAILED DESCRIPTION

In accordance with an embodiment of the present invention, a computer system allows an expansion component of the computer system to operate even when the computer system is in a low-power mode. According to an embodiment of the present invention, the computer system includes a local system bus connected between a processor and an expansion component and an isolation circuit electrically separating the local system bus into a section connected to the processor and a section connected to the expansion component such that during a normal-power mode, the section connected to the expansion component and the section connected to the processor are coupled together and during a low-power mode, the section connected to the expansion component and the section connected to the processor are isolated from each other.

The section of the local system bus connected to the processor also includes fixed system components that are powered down, i.e., switched off during the low-power mode. Alternatively, the section of the local system bus connected to the expansion component includes system components that require power when the computer system is in the low-power mode. Because the switched off system components negatively affect the local system bus, rendering it unusable during the low-power mode, the isolation circuit is provided to electrically separate the local system bus. Therefore, the negative interference of the switched off system components is eliminated.

FIG. 1 is a block diagram representation of a computer system architecture in accordance with an embodiment of the present invention. Computer system 100 includes a motherboard 105 on which system components such as microprocessor or processor 110, network adapter 190, monitoring circuit 180, expansion slots 130–133 and system devices 120–122 are located. Computer system 100 is controlled primarily by computer readable instructions, which can be in the form of software, wherever, or by whatever means such software is stored or accessed. Such software may be executed with the microprocessor 110 to cause computer system 100 to do work.

Each of the system components is connected to a local system bus. The local system bus is electrically separated into two sections, system bus 111 and Peripheral Component Interconnect ("PCI") system bus 160, the PCI Local Bus revision 2.1, of PCI Special Interest Group, located in Portland, Oregon. An isolation circuit 150 is used to electrically separate the local system bus into system bus 111 and PCI system bus 160. Isolation circuit 150 includes a field effect transistor (FET). The FET is controlled by a power supply "power-good signal." Besides the voltages and current computer system 100 needs to operate, the power supply provides a power-good signal to tell computer system 100 that all is well with the power supply and the computer can operate normally.

System devices 120 and 121 are coupled to system bus 111. These system devices include Dual In-line Memory Modules (DIMM) 120 for accommodating random access memory (RAM) and read only memory (ROM) and clock buffer 121. Although only two system devices are shown, other system devices may be used without departing from the scope of the present invention.

An expansion card or board is a circuit board that includes chips and other electronic components and circuitry connected that add functions or resources to computer system 100. Typically expansion cards add memory, disk-drive controllers, video support, parallel and serial ports, and internal modems. The expansion cards may include Peripheral Component Interconnect (PCI) cards, Video Electronics Standards Association (VESA) cards, as well other types of expansion cards.

According to one embodiment of the present invention, an expansion card includes a monitoring circuit that monitors the status of computer system 100. For example, the monitoring circuit monitors the temperature of the system components to determine if the temperature of the system components exceeds a predetermine value. Thus, the monitoring circuit would prevent the computer from overheating. In addition, the monitoring circuit monitors voltage supplied to the system components to determine whether the supplied voltage exceeds a predetermined threshold. Other types of monitoring circuits may be used to monitor various events regarding computer system 100. Thus expansion slots 130–133 connected to PCI system bus 160 may be used to receive various types of expansion cards such as an expansion card containing the monitoring circuit. Alternatively, and as shown in FIG. 1, the monitoring circuit 180 may be directly connected to PCI system bus 160.

Also connected to PCI system bus 160 is network adapter 190. Network adapter 190 may be used to connect computer system 100 to a local area network (LAN) 195. LAN 195 may provide computer system 100 users with a means of communicating and transferring software and information electronically. Additionally, LAN 195 may provide distributed processing, which involves several computers in the sharing of workloads or cooperative efforts in performing a task. According to an embodiment of the present invention, network adapter 190 is used to report the results from the monitoring circuit 180 to LAN 195.

In order to manage the power used by system components, the computer system may operate according to the Advanced Power Management (APM) interface specifications (APM BIOS Interface Specification, version 1.2, February 1996) is incorporated to control system component power saving features with software control. APM is an overall computer system feature. Although it has the ability to individually control features of each of the system components it manages, APM also controls all system features together to conserve power. APM provides for power savings at five levels:

Full On mode—the computer system is operating at full or normal power with all system components running in their normal full power consumption modes.

APM Standby mode—the microprocessor may stop and many of the system components are turned off or operate at reduced power. The computer system usually cannot process data, but its memory is kept alive and the status of all system components is preserved.

APM Suspended mode—the computer system shifts to its maximum power saving mode-most system components are switched off and the microprocessor switches to its lowest power state with its clock turned off.

Hibernation mode—is a special implementation of the suspend mode that allows the computer system to be switched entirely off and still be restored to the point at which it entered the suspend stated. When entering the hibernation mode, the computer system copies memory and other status data to nonvolatile storage such as the hard disk which allows for memory power to be switched off.

Off mode—power to the computer system is entirely off.

According to an embodiment of the present invention, when computer system 100 is operating in the normal mode, all system components are fully operating. In addition, system bus 111 is electrically connected to PCI system bus 160. Thus, each of the system components is fully operable and can communicate with each other and with external components.

When computer system 100 is in a low-power mode such as the APM Standby, APM Suspended or Hibernation modes, however, system components connected to system bus 111 are either powered down or switched off. The switched off system components negatively affect the system bus rendered unusable during the low-power mode. Alternatively, system components connected the PCI system bus 160 still require power when computer system 100 operates in this mode. The isolation circuit is provided to electrically separate the system bus 111 from PCI system bus 160. Therefore, the negative interference from the powered off system components is eliminated and the expansion components requiring power can operate in a normal fashion.

Several embodiments of the present invention are specifically illustrated and/or described herein. However, it will be appreciated that modifications and variations of the embodiments of the present invention are covered by the above teachings and within the purview of the appended claims without departing from the spirit and intended scope of the invention.

What is claimed is:

1. A computer system comprising:
    a local system bus located on a system board coupled between a processor and an expansion component; and
    an isolation circuit separating said local system bus into a first and a second section on the system board such that during a normal-power mode, said first and second sections are coupled together and during a low-power mode, said first and second sections are isolated from each other.

2. The computer system according to claim 1, wherein said first section of said local system bus is connected to said processor.

3. The computer system according to claim 1, wherein said second section of said system bus is connected to said expansion component.

4. The computer system according to claim 3, wherein said second section of said local system bus is a peripheral component interconnect (PCI) system bus.

5. The computer system according to claim 3, wherein said expansion component is a PCI card.

6. The computer system according to claim 1, wherein said isolation circuit electrically separates said local system bus into said first and second sections.

7. The computer system according to claim 1, wherein said isolation circuit includes a field effect transistor (FET).

8. The computer system according to claim 7, wherein said FET is controlled a power-good signal from a power supply.

9. The computer system according to claim 3, further comprising a network adapter.

10. The computer system according to claim 9, wherein said network adapter is connected to said second section of said local system bus.

11. The computer system according to claim 9, wherein said network adapter is used communicated with a local area network (LAN).

12. The computer system according to claim 11, wherein said network adapter alerts said (LAN) of information from a monitoring circuit.

13. The computer system according to claim 3, further comprising a monitoring circuit.

14. The computer system according to claim 13, wherein said monitoring circuit is connected to said expansion component.

15. The computer system according to claim 13, wherein said monitoring circuit monitors the status of said computer system.

16. A computer system comprising:
   a local system bus located on a system board having a first section and a second section on the system board; and
   an isolation circuit selectively establishing a connection from said first section of said local system bus to said second section of said local system bus during a normal-power mode of said computer system and removing the connection from said first section of said local system bus to said second section of said local system bus during a low-power mode.

17. The computer system according to claim 16, wherein said first section of said local system bus is coupled to a processor.

18. The computer system according to claim 16, wherein said second section of said local system bus is coupled to an expansion card.

19. The computer system according to claim 16, wherein said local system bus is electrically separated.

20. A computer system comprising:
   a processor;
   a system bus located on a system board and coupled to said processor an expansion component;
   a peripheral bus located on the system board and coupled to said expansion component;
   an isolation circuit selectively establishing a connection between said system bus and said peripheral bus during a normal-power mode of said computer system and removing the connection between said system bus and said peripheral bus during a low-power mode.

21. A computer system, comprising:
   a system bus on a system board;
   an isolation circuit separating the system bus into a first section and a second section on the system board;
   a first component connected to the first section of the system bus; and
   a second component connected to the second section of the system bus,
   wherein during a normal-power mode the isolation circuit electrically connects the first section to the second section and both the first and second components can use the system bus, and during a low-power mode of operation the isolation circuit electrically isolates the first section from the second section and the second component can use the second section of the system bus without interference from the first component.

22. The computer system as recited in claim 21, wherein the first component comprises a system component located on a motherboard and the second component comprises an expansion component, and wherein during the low-power mode the first component is powered off.

23. The computer system as recited in claim 21, further comprising:
   a third component connected to the second section of the system bus,
   wherein the second and third components can communicate with each other over second section of the system bus during the low-power mode.

24. The computer system as recited in claim 23, wherein the first component comprises a system component located on a motherboard and the second component and third components each comprise an expansion component, and wherein during the low-power mode the first component is powered off and the second and third components can continue to use the system bus without interference from the first component.

* * * * *

UNITED STATES PATENT AND TRADEMARK OFFICE
CERTIFICATE OF CORRECTION

PATENT NO.    : 6,622,250 B1
DATED         : September 16, 2003
INVENTOR(S)   : Castillo et al.

It is certified that error appears in the above-identified patent and that said Letters Patent is hereby corrected as shown below:

Column 1,
Line 13, after "main", delete "to".

Signed and Sealed this

First Day of June, 2004

JON W. DUDAS
*Acting Director of the United States Patent and Trademark Office*